United States Patent
Fukuda (10) Patent No.: US 7,714,777 B2
(45) Date of Patent: May 11, 2010

(54) SEMICONDUCTOR DEVICE FOR SPREAD SPECTRUM RADAR APPARATUS

(75) Inventor: Takeshi Fukuda, Osaka (JP)

(73) Assignee: Panasonic Corporation, Osaka (JP)

( * ) Notice: Subject to any disclaimer, the term of this patent is extended or adjusted under 35 U.S.C. 154(b) by 118 days.

(21) Appl. No.: 11/939,803

(22) Filed: Nov. 14, 2007

(65) Prior Publication Data

US 2008/0204307 A1 Aug. 28, 2008

(30) Foreign Application Priority Data

Nov. 15, 2006 (JP) ............................. 2006-309283

(51) Int. Cl.
- G01S 7/28 (2006.01)
- G01S 7/02 (2006.01)
- H04B 1/69 (2006.01)
- H04B 1/707 (2006.01)
- G01S 13/00 (2006.01)

(52) U.S. Cl. ........................... 342/175; 342/82; 342/89; 342/118; 342/134; 342/135; 342/195; 342/202

(58) Field of Classification Search ......... 375/130–153; 342/21, 22, 89–103, 159–175, 192–197, 342/27, 28, 61, 70–72, 200–205, 118, 127–145
See application file for complete search history.

(56) References Cited

U.S. PATENT DOCUMENTS 4,325,138 A * 4/1982 Zscheile, Jr. ................. 375/130

(Continued)

FOREIGN PATENT DOCUMENTS

JP 7-012930 1/1975

OTHER PUBLICATIONS

English language Abstract of JP 7-012930.

(Continued)

*Primary Examiner*—Bernarr E Gregory
(74) *Attorney, Agent, or Firm*—Greenblum & Bernstein, P.L.C.

(57) ABSTRACT

Provided is a semiconductor device for a spread spectrum radar apparatus which suppresses spurious signals resulting from non-linearity of active elements. The semiconductor device as the inverse spread spectrum modulation unit for the spread spectrum radar apparatus has a coupled line of two lines and another coupled line of two lines. The semiconductor device includes: an unbalanced to balanced transforming circuit which converts a received signal inputted as an unbalanced signal into a balanced signal pair; a switch circuit having one or more transistors; and a balanced inverse spread spectrum circuit which obtains as differential signal PN signals belonging to the same sequence code as a PN code which is used to generate an original signal of the received signal, also obtains the balanced signal pair from the unbalanced to balanced transforming circuit, and performs inverse spread spectrum modulation on the balanced signal pair by the switch circuit using the PN codes inputted as the differential signal.

12 Claims, 5 Drawing Sheets

U.S. PATENT DOCUMENTS

| | | | | |
|---|---|---|---|---|
| 4,443,799 A | * | 4/1984 | Rubin | 342/201 |
| 4,679,048 A | * | 7/1987 | Brandsetter et al. | 342/61 |
| 5,258,996 A | * | 11/1993 | Fraser et al. | 342/200 |
| 5,258,997 A | * | 11/1993 | Fraser et al. | 342/200 |
| 5,731,781 A | * | 3/1998 | Reed | 342/70 |
| 5,959,571 A | * | 9/1999 | Aoyagi et al. | 342/70 |
| 6,031,485 A | * | 2/2000 | Cellai et al. | 342/192 |
| 6,094,160 A | * | 7/2000 | Lajiness | 342/70 |
| 6,424,289 B2 | * | 7/2002 | Fukae et al. | 342/27 |
| 6,614,387 B1 | * | 9/2003 | Deadman | 342/70 |
| 7,406,115 B2 | * | 7/2008 | Nakano et al. | 375/150 |
| 2007/0109175 A1 | | 5/2007 | Fukuda | |
| 2007/0285307 A1 | | 12/2007 | Nishijima et al. | |

OTHER PUBLICATIONS

U.S. Appl. No. 11/816,794 to Fukuda, filed on Aug. 21, 2007.

* cited by examiner

FIG. 1  Prior Art

Prior Art

SEMICONDUCTOR DEVICE FOR SPREAD SPECTRUM RADAR APPARATUS

BACKGROUND OF THE INVENTION (1) Field of the Invention

The present invention relates to semiconductor devices which are used and embedded in spread spectrum radar apparatuses employing a spread spectrum scheme, and more particularly to a semiconductor device which is used in such spread spectrum radar apparatuses and suppresses spurious signals caused by non-linear components of active elements.

(2) Description of the Related Art

In recent years, radar apparatuses have been equipped in vehicles to detect preceding vehicles, obstacles located backward, and the like. This provides significant achievements, including safety improvement such as collision avoidance, enhancement of driving convenience represented by reverse driving support, and the like. In accordance with the achievements, various technologies regarding radar apparatuses equipped in vehicles (hereinafter, referred to as "in-vehicle radar apparatuses") have been proposed. One example of such technologies is a radar apparatus using a spread spectrum scheme (hereinafter, referred to as a "spread spectrum radar apparatus") (see Japanese Unexamined Patent Application Publication No. 7-12930, for example).

For such an in-vehicle radar apparatus, it is critical to suppress influence of radio waves transmitted from same- or similar-type radar apparatuses equipped in other vehicles. In order to achieve this, the spread spectrum radar apparatus transmits radio waves which are received and suppressed by different-type radar apparatuses using different code sequences or different schemes. Thereby, the spread spectrum radar apparatuses do not much affect radar apparatuses of different types. Moreover, the spread spectrum radar apparatuses do not have any serious troubles for their object detection ability, even if undesired radio waves are transmitted from other spread spectrum radar apparatuses or radio communication apparatuses using the same frequency band.

This is because, in the spread spectrum radar apparatuses, the radio waves whose frequency is spectrum-spread over a wider band using pseudo noise codes (hereinafter, referred to as "PN codes") are transmitted. Further, since radio waves are spectrum-spread over a wider band, power consumption per unit frequency is reduced and the influence to other radar apparatuses is decreased. Furthermore, by adjusting a chip rate and a code period of the PN code, a relationship between distance resolution and the maximum detectable distance is set flexibly and the radio waves are thereby transmitted continuously, so that peak power is not increased.

Figure 1:
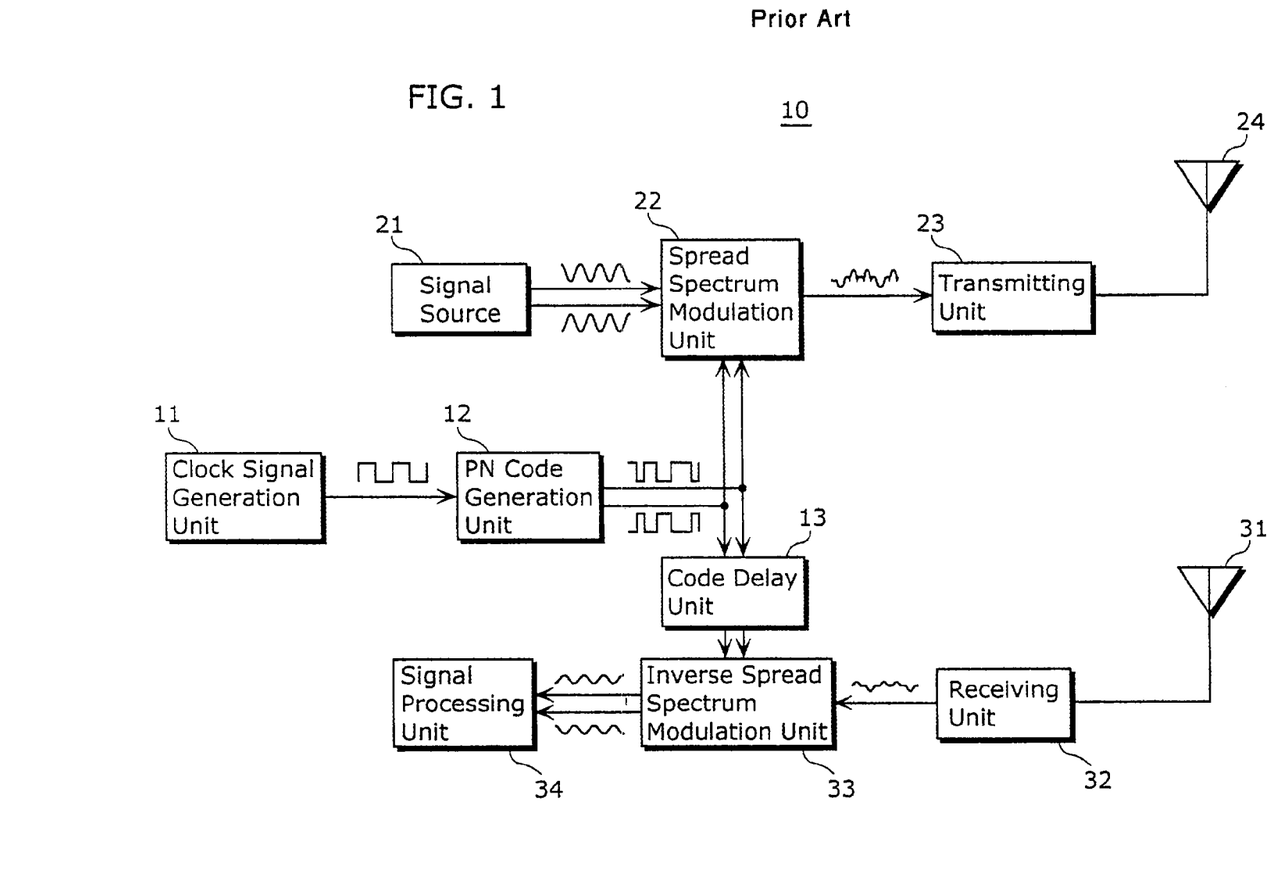
FIG. 1 is a diagram showing a structure of a conventional spread spectrum radar apparatus.

FIG. 1 is a diagram showing a structure of the conventional spread spectrum radar apparatus. The conventional spread spectrum radar apparatus 10 shown in FIG. 1 includes a clock signal generation unit 11, a PN code generation unit 12, a code delay unit 13, a signal source 21, a spread spectrum modulation unit 22, a transmitting unit 23, a transmission antenna 24, a receiving antenna 31, a receiving unit 32, an inverse spread spectrum modulation unit 33, and a signal processing unit 34. Here, it is assumed that the spread spectrum radar apparatus 10 uses a M-sequence code as the PN code. As shown in FIG. 1, it is assumed that the conventional spread spectrum radar apparatus 10 uses autocorrelation characteristics that a M-sequence code has a single peak. Using the autocorrelation characteristics, a delay time period is varied to detect the delay time period during which the single peak is obtained, thereby measuring reflection intensity at an object and a distance to the object.

In the spread spectrum radar apparatus 10, the signal source 21 generates a narrow-band signal, and the spread spectrum modulation unit 22 performs spread-spectrum modulation on the narrow-band signal using a PN code generated by the PN code generation unit 12, in order to generate a broad-band signal. Then, the spread spectrum modulation unit 22 outputs the resulting broad-band signal to the transmission antenna 24 via the transmitting unit 23. The transmission antenna 24 transmits the obtained broad-band signal as detection radio waves.

Moreover, in the spread spectrum radar apparatus 10, the receiving antenna 31 receives reflected waves of the detection radio waves which have been transmitted and then reflected at an object. The receiving antenna 31 provides, as received signal, the reflected waves to the inverse spread spectrum modulation unit 33 via the receiving unit 32. The inverse spread spectrum modulation unit 33 performs inverse spread-spectrum modulation on the received signal, using a PN code which is delayed by the code delay unit 13. Then, the inverse spread spectrum modulation unit 33 provides the resulting signal to the signal processing unit 34.

Here, it is examined the case where the signal provided by the inverse spread spectrum modulation unit 33 has the same frequency components as the narrow-band signal generated by the signal source 21. In this case, the signal processing unit 34 determines the time period which is delayed by the code delay unit 13, as a time period during which the detection radio waves have been transmitted and returned (hereinafter, referred to as a "reciprocating propagation time period"). In addition, a distance corresponding to the determined reciprocating propagation time period is determined as a distance to the object.

On the other hand, it is examined the case where the signal provided by the inverse spread spectrum modulation unit 33 does not have the same frequency components as the narrow-band signal generated by the signal source 21. In the case, the signal processing unit 34 changes a time period delayed by the code delay unit 13.

Here, the inverse spread spectrum modulation unit 33 generally includes a Binary Phase Shift Keying modulator (BPSK modulator) such as a balanced mixer.

Figure 2:
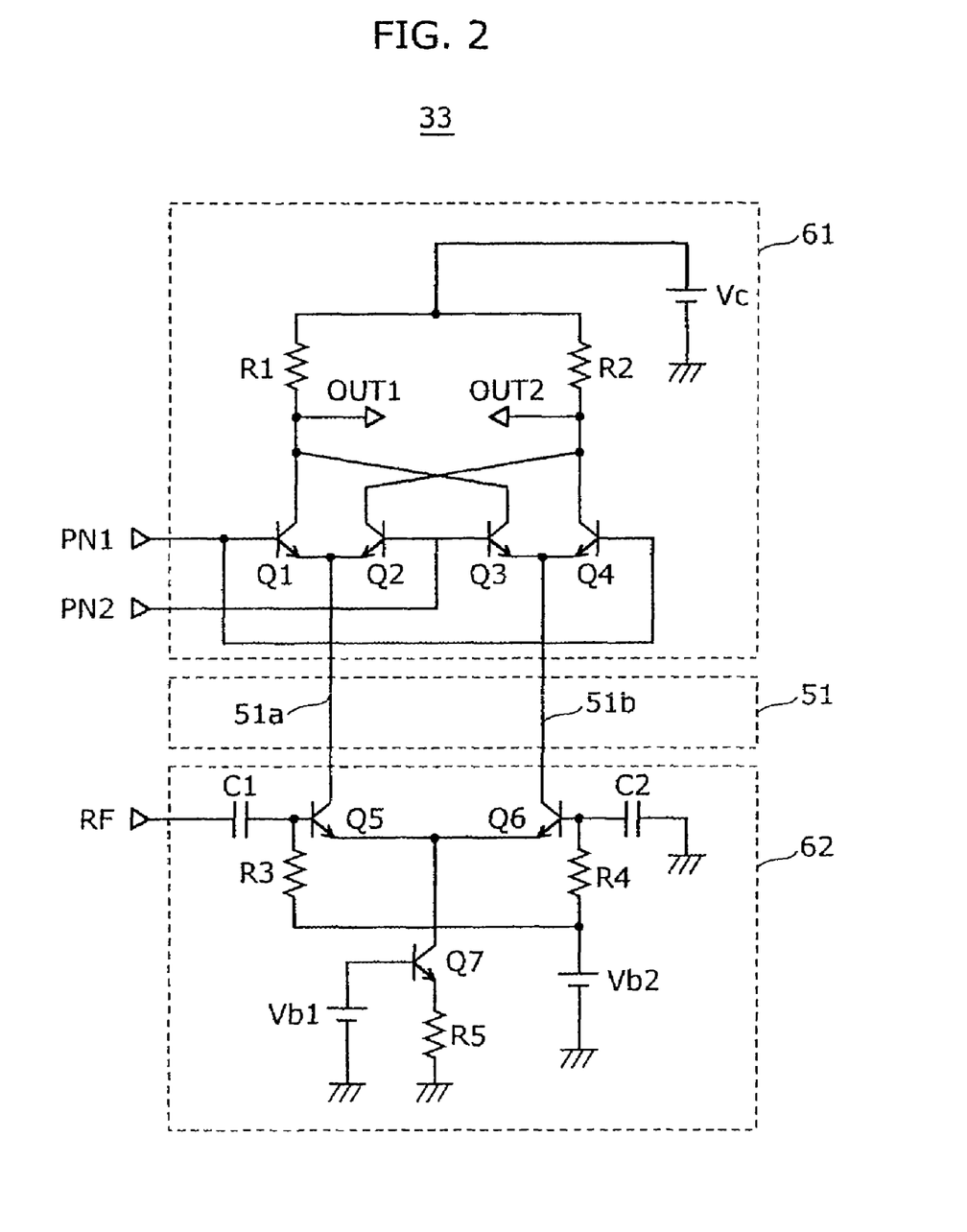
FIG. 2 is a diagram showing a circuit configuration of a semiconductor device (inverse spread spectrum modulation unit) in the conventional spread spectrum radar apparatus.

FIG. 2 is a diagram showing a circuit configuration of the inverse spread spectrum modulation unit (semiconductor device) of the conventional spread spectrum radar apparatus. As shown in FIG. 2, the inverse spread spectrum modulation unit 33 of the conventional spread spectrum radar apparatus includes a balanced inverse spread spectrum circuit 61 and an unbalanced to balanced transforming circuit 62. The unbalanced to balanced transforming circuit 62 includes a current power circuit which supplies bias currents to operate transistors included in the balanced inverse spread spectrum circuit 61. The balanced inverse spread spectrum circuit 61 includes transistors Q1, Q2, Q3, and Q4, resistors R1 and R2, a power source Vc, output terminals OUT1 and OUT2, and pseudo-noise (PN) code terminals PN1 and PN2. The unbalanced to balanced transforming circuit 62 includes transistors Q5, Q6, and Q7, capacitors C1 and C2, resistors R3, R4, and R5, a received signal terminal RF, and power sources Vb1 and Vb2. The balanced inverse spread spectrum circuit 61 and the unbalanced to balanced transforming circuit 62 are connected with each other via a balanced line 51 including a line 51a and a line 51b. The inverse spread spectrum modulation unit 33 is well-known as a Gilbert cell. The inverse spread spectrum modulation unit 33 is designed so that delay does not occur between a pair of a balanced signal consisting of a positive signal and a negative signal (hereinafter, referred to also as "balanced signal pair).

In more detail, in the inverse spread spectrum modulation unit 33, a base of the transistor Q5 is connected to the received signal terminal RF via the capacitor C1, and a base of the transistor Q6 is connected to ground at high frequency via the capacitor C2. A collector of the transistor Q5 is connected the line 51a, and a collector of the transistor Q6 is connected to the line 51b. When an unbalanced signal is inputted from the received signal terminal RF, the inputted unbalanced signal is converted into a balanced signal pair which is then outputted to the balanced line 51.

Furthermore, in the inverse spread spectrum modulation unit 33, bases of the transistors Q1 and Q4 are connected to the PN code terminal PN1, and bases of the transistors Q2 and Q3 are connected to the PN code terminal PN2. Collectors of the transistors Q1 and Q3 are connected to the output terminal OUT1, and collectors of the transistors Q2 and Q4 are connected to the output terminal OUT2. Emitters of the transistors Q1 and Q2 are connected to the line 51a, and emitters of transistors Q3 and Q4 are connected to the line 51b. When the balanced signal pair is inputted via the balanced line 51 to a switch circuit which includes the transistors Q1, Q2, Q3, and Q4, polarities of the inputted balanced signal pair is reversed depending on the PN codes which are inputted as a differential signal from the PN code terminals PN1 and PN2. The positive and negative signals in the pair whose polarities are reversed are outputted from the output terminals OUT1 and OUT2, respectively.

Unfortunately, following problem is encountered in the conventional technology. Here, it is assumed that the detection radio waves have been transmitted for a predetermined time period and then the transmitted detection radio waves have been reflected at a plurality of objects, so that the receiving antenna 31 receives plural kinds of reflected waves having respective different reciprocating propagation time periods. Then, a plurality of different received signals are inputted into the inverse spread spectrum modulation unit 33, and thereby the signals outputted from the inverse spread spectrum modulation unit 33 have distortion, which results in a problem that spurious signals occur where signals do not exist originally.

This problem is caused by the following reasons. Regarding the transistor Q5 to which the plurality of received signals are inputted, a collector current ($I_C$) is exponentially varied depending on a collector-to-emitter voltage ($V_{CE}$), as obvious from the characteristics ($I_C$-$V_{CE}$ characteristics) between the collector current ($I_C$) and the collector-to-emitter voltage ($V_{CE}$). Thereby, the signals outputted from the transistor Q5 include high-order components of the inputted signals, and these high-order components occur as the distortion.

More specifically, the high-order components cause components generated by multiplication operations among the plurality of the received signals. By shift additivity of M-sequence codes, the generated components become a signal that is equivalent to the signal which is generated by spread-spectrum modulation using the same M-sequence code and which has the third delay amount different from the delay amount of each of the received signals. Thereby, in the signals outputted from the inverse spread spectrum modulation unit 33, a spurious signal occurs as if a reflecting object is located at a position which corresponds to the third delay amount and at which such an object is not located actually. As a result, inconvenience occurs.

Note that the shift additivity of M-sequence codes means characteristics that, when an EXCLUSIVE-OR operation is performed on two M-sequence codes which have different delay amounts but are generated by the same M-sequence code generator, a M-sequence code is generated which has the third delay amount different from the delay amounts of the former M-sequence codes.

Furthermore, the conventional technology encounters another problem. Since only a base of the transistor Q6 is connected to ground at high frequency, the transistors Q5 and Q6 are operated in an unbalanced state. In such a state, the balanced signal pair outputted from the transistors Q5 and Q6 has even-order components which are originally suppressed in a differential circuit. Thereby, undesired signals resulted from the shift additivity of M-sequence codes are generated, so that the signals outputted from the inverse spread spectrum modulation unit 33 include spurious signals.

SUMMARY OF THE INVENTION

Thus, the present invention overcomes the problems of the conventional technologies as described above. It is an object of the present invention to provide a semiconductor device which is used in a spread spectrum radar apparatus and suppresses spurious signals caused by non-linear components of active elements. It is another object of the present invention to provide a spread spectrum radar apparatus in which the semiconductor device is embedded.

In accordance with an aspect of the present invention for achieving the object, there is provided (a) a semiconductor device for a spread spectrum radar apparatus, the semiconductor device being embedded in the spread spectrum radar apparatus which transmits, as a detection radio wave, a broadband signal generated using a pseudo-noise code, receives a reflected wave of the detection radio wave that is reflected at an object and returns, and detects the object by the reflected wave of the detection radio wave using the pseudo-noise code, said semiconductor device comprising: (a1) an unbalanced to balanced transforming circuit which includes a first coupled line and a second coupled line that receive, as an unbalanced signal, a received signal corresponding to the reflected wave of the detection radio wave, and which converts the received signal into a pair of a balanced signal consisting of a positive signal and a negative signal, and outputs the pair of the balanced signal from the first coupled line and the second coupled line; and (a2) a balanced inverse spread spectrum circuit which includes a switch circuit having at least one transistor, and which receives, as a differential signal, pseudo-noise codes belonging to a same sequence code as the pseudo-noise code which is used in the generation of the broad-band signal, obtains the pair of the balanced signal from said unbalanced to balanced transforming circuit, performs inverse spread spectrum modulation on the pair of the balanced signal to generate a differential signal by said switch circuit using the pseudo-noise codes as the differential signal, and outputs, as output signals, the differential signal generated by the inverse spread-spectrum modulation, wherein said unbalanced to balanced transforming circuit and said balanced inverse spread spectrum circuit are formed on a same semiconductor substrate.

With the above configuration, the semiconductor device according to the present invention has the unbalanced to balanced transforming circuit (balun) consisting of passive elements, instead of the conventional transistors which are active elements. Thereby, received signals are not inputted directly into active elements but to the unbalanced to balanced transforming circuit (balun) consisting of the passive elements, which makes it possible to suppress spurious signals resulting from non-linear components of the active elements, eventually outputting ideal signals.

Note that the present invention may be realized not only as the above semiconductor device, but also as a spread spectrum radar apparatus in which the semiconductor device is embedded.

According to the semiconductor device of the present invention, when transmitted radio waves are received, received signals corresponding to the waves are inputted directly into an unbalanced to balanced transforming circuit consisting of passive elements in order to suppress signal distortion, which makes it possible to suppress spurious signals caused by the shift additivity of M-sequence codes, thereby providing an ideal radar apparatus.

FURTHER INFORMATION ABOUT TECHNICAL BACKGROUND TO THIS APPLICATION

The disclosure of Japanese Patent Application No. 2006-309283 filed on Nov. 15, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

The following describes the preferred embodiment of the present invention with reference to the drawings.

A semiconductor device for a spread spectrum radar apparatus according to the embodiment of the present invention is characterized in the following features (a) to (d).

(a) A semiconductor device for a spread spectrum radar apparatus, the semiconductor device being embedded in the spread spectrum radar apparatus which transmits, as a detection radio wave, a broad-band signal generated using a pseudo-noise code, receives a reflected wave of the detection radio wave that is reflected at an object and returns, and detects the object by the reflected wave of the detection radio wave using the pseudo-noise code, said semiconductor device comprising: (a1) an unbalanced to balanced transforming circuit which includes a first coupled line and a second coupled line that receive, as an unbalanced signal, a received signal corresponding to the reflected wave of the detection radio wave, and which converts the received signal into a pair of a balanced signal consisting of a positive signal and a negative signal, and outputs the pair of the balanced signal from the first coupled line and the second coupled line; and (b) a balanced inverse spread spectrum circuit which includes a switch circuit having at least one transistor, and which receives, as a differential signal, pseudo-noise codes belonging to a same sequence code as the pseudo-noise code which is used in the generation of the broad-band signal, obtains the pair of the balanced signal from said unbalanced to balanced transforming circuit, performs inverse spread spectrum modulation on the pair of the balanced signal to generate a differential signal by said switch circuit using the pseudo-noise codes as the differential signal, and outputs, as output signals, the differential signal generated by the inverse spread-spectrum modulation, wherein said unbalanced to balanced transforming circuit and said balanced inverse spread spectrum circuit are formed on a same semiconductor substrate.

(b) The switch circuit may includes at least a first transistor, a second transistor, a third transistor, and a fourth transistor, (b1) a first terminal of the first transistor and a first terminal of the fourth transistor are connected to a first pseudo-noise input terminal from which a first pseudo-noise signal in the pseudo-noise codes as the differential signal is inputted, and a first terminal of the second transistor and a first terminal of the third transistor are connected to a second pseudo-noise input terminal from which a second pseudo-noise signal in the pseudo-noise codes as the differential signal is inputted, (b2) a second terminal of the first transistor and a second terminal of the second transistor are connected to a positive signal input terminal from which the positive signal in the pair is inputted, and a second terminal of the third transistor and a second terminal of the fourth transistor are connected to a negative signal input terminal from which the negative signal in the pair is inputted, and (b3) a third terminal of the first transistor and a third terminal of the third transistor are connected to a first signal output terminal from which a first output signal of the differential signal as the output signals is outputted, and a third terminal of the second transistor and a third terminal of the fourth transistor are connected to a second signal output terminal from which a second output signal of the differential signal as the output signals is inputted.

(c) The first coupled line includes a first line and a second line which are arranged in parallel with each other and electromagnetically coupled with each other, the second coupled line includes a third line and a fourth line which are arranged in parallel with each other and electromagnetically coupled with each other, one end of the second line is connected with one end of the fourth line to form one line, other end of the second line receives the received signal, and the unbalanced to balanced transforming circuit (balun) may include: a positive signal output terminal which is connected to one end of the first line, and from which the positive signal in the pair is outputted; and a negative signal output terminal which is connected to one end of the third line, and from which the negative signal in the pair is outputted, wherein a first end terminal corresponding to the positive signal output terminal and a second end terminal corresponding to the negative signal output terminal are respectively connected to ground at high frequency, and the first end terminal and the second end terminal are also connected to a DC power source circuit, wherein the DC power source circuit supplies predetermined currents to the positive signal input terminal via the positive signal output terminal, and to the negative signal input terminal via the negative signal output terminal.

(d) The first to fourth transistors may be bipolar transistors, with the respective first terminals being bases, the respective second terminals being emitters, and the respective third terminals being collectors.

Further, (e) the first to fourth transistors may be field-effect transistors, with the respective first terminals being gates, the respective second terminals being sources, and the respective third terminals being drains.

Furthermore, (f) the unbalanced to balanced transforming circuit and said balanced inverse spread spectrum circuit may be connected with each other via a differential amplifier.

In accordance with the above characteristics, the following describes the semiconductor device and the spread spectrum radar apparatus using the semiconductor device according to the present embodiment.

Figure 3:
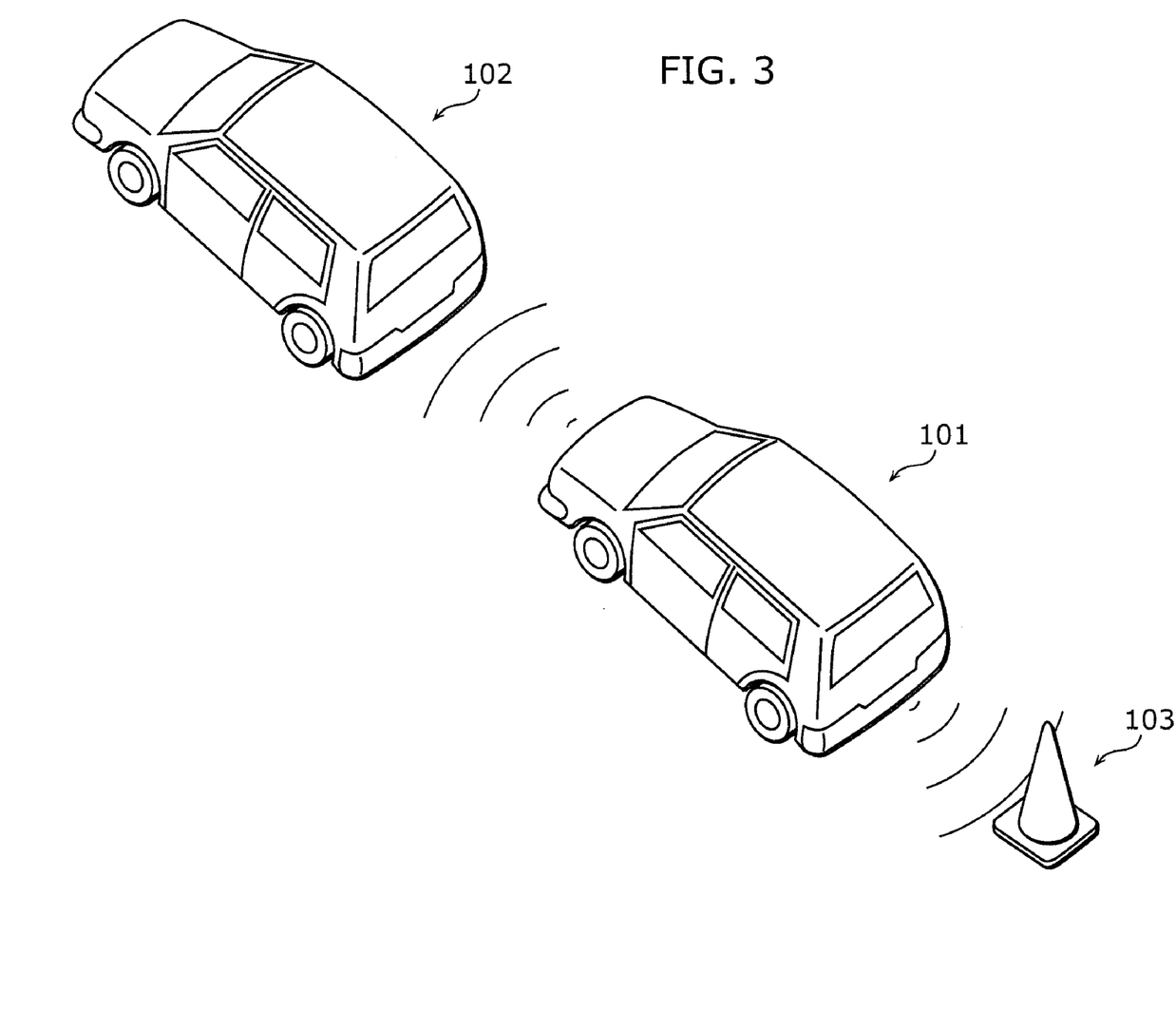
FIG. 3 is a diagram showing how a spread spectrum radar apparatus according to an embodiment of the present invention is utilized.

FIG. 3 is a diagram showing how the spread spectrum radar apparatus according to the present embodiment is utilized. As shown in FIG. 3, for one example, the spread spectrum radar apparatuses are equipped at front and rear sides of a vehicle 101. In this case, the spread spectrum radar apparatuses equipped in the vehicle 101 transmit detection radio waves to objects such as a preceding vehicle 102 and an obstacle 103. The transmitted radio waves are reflected at the objects, and the reflected waves of the detection radio waves are received by the respective spread spectrum radar apparatuses. Thereby, it is possible to determine existence of the object, a distance to the object, a relative speed of the object, and the like, based on the received reflected waves of the detection radio waves.

More specifically, each of the spread spectrum radar apparatuses generates detection radio waves using a M-sequence code as a PN code, and transmits the generated detection radio waves. The spread spectrum radar apparatus receives reflected waves of the transmitted detection radio waves which have been reflected at an object. Based on the received reflected waves of the detection radio waves, the spread spectrum radar apparatus determines the PN code which has been used to generate the detection radio waves. In the determination, the PN code is determined using the autocorrelation characteristics of M-sequence codes that each M-sequence code has a single peak, so that a PN code whose peak correlated with the reflected waves is a single peak is determined as the PN code used to generate the detection radio waves. In addition, the spread spectrum radar apparatus measures a time period from the generation of the determined PN code to the receiving of the reflected waves. A distance to the object and reflection intensity of the object are determined using the measured time period and intensity of the reflected waves.

Figure 4:
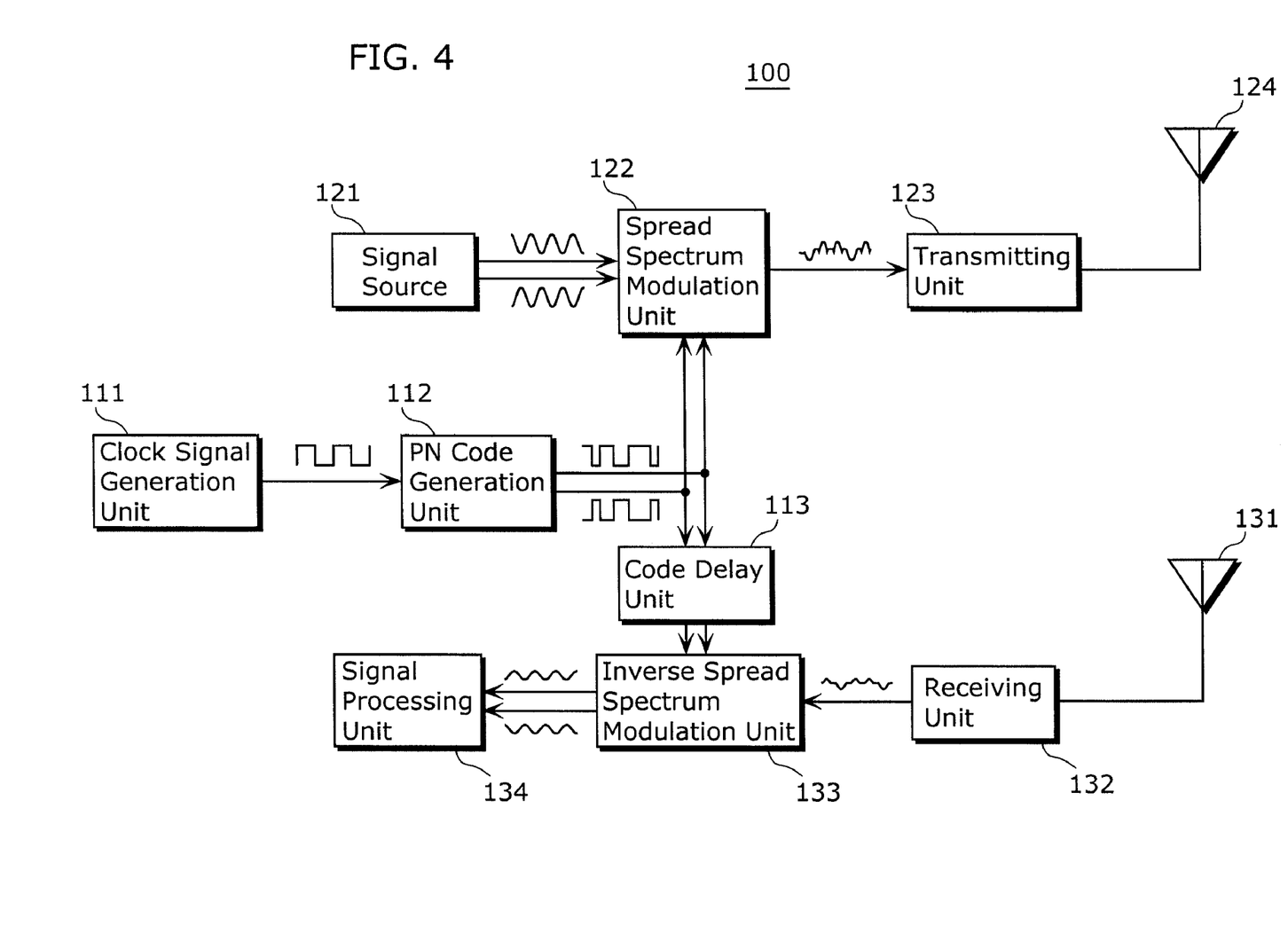
FIG. 4 is a diagram showing a structure of the spread spectrum radar apparatus according to the embodiment of the present invention.

FIG. 4 is a diagram showing a structure of the spread spectrum radar apparatus according to the present embodiment. As shown in FIG. 4, the spread spectrum radar apparatus 100 of the present embodiment includes a clock signal generation unit 111, a PN code generation unit 112, a code delay unit 113, a signal source 121, a spread spectrum modulation unit 122, a transmitting unit 123, a transmission antenna 124, a receiving antenna 131, a receiving unit 132, an inverse spread spectrum modulation unit 133, and a signal processing unit 134. Note that these units except the inverse spread spectrum modulation unit 133 have the same functions as the functions of the conventional spread spectrum radar apparatus of FIG. 1.

The clock signal generation unit 111 generates clock signals. The clock signal generation unit 111 outputs the generated clock signals to the PN code generation unit 112.

The PN code generation unit 112 obtains the clock signals from the clock signal generation unit 111. The PN code generation unit 112 generates PN codes depending on the inputted clock signals. The PN code generation unit 112 provides the generated PN codes to the spread spectrum modulation unit 122 and the code delay unit 113.

The code delay unit 113 obtains the PN codes from the PN code generation unit 112. To the inverse spread spectrum modulation unit 133, the code delay unit 113 outputs the PN codes to be delayed by varying delay time periods.

The signal source 121 generates narrow-band signals. The signal source 121 outputs the generated narrow-band signals to the spread spectrum modulation unit 122. Here, as one example, high-frequency signals in the gigahertz band are used as the narrow-band signals.

The spread spectrum modulation unit 122 obtains the PN codes from the PN code generation unit 112. The spread spectrum modulation unit 122 also obtains the narrow-band signals from the signal source 121. The spread spectrum modulation unit 122 performs spread-spectrum modulation on each narrow-band signal using the PN code, so as to generate a broad-band signal. The resulting broad-band signal is outputted to the transmitting unit 123.

In the spread-spectrum modulation, according to the PN code, a phase of the narrow-band signal is modulated into one of two phases, in other words, 0 degree or 180 degrees, and the frequency of the signal is thereby spectrum-spread over a frequency band whose width is twice of a bitrate of the PN code. This reduces power per unit frequency for detection radio waves transmitted from the transmission antenna 124.

The transmitting unit 123 obtains the broad-band signal from the spread spectrum modulation unit 122. For the broad-band signal, the transmitting unit 123 performs appropriate signal processing such as frequency conversion and amplification, and then provides the resulting signal to the transmission antenna 124.

The transmission antenna 124 obtains the broad-band signal from transmitting unit 123 and transmits the broad-band signal as detection radio waves.

Here, for the sake of simplified explanation, it is assumed that the detection radio waves transmitted from the transmission antenna 124 are reflected at an object and the resulting reflected waves of the detection radio waves are received by the receiving antenna 131.

The receiving antenna 131 receives the reflected waves of the detection radio waves. The receiving antenna 131 provides the received reflected waves to the receiving unit 132 as a received signal.

The receiving unit 132 obtains the received signal from the receiving antenna 131. For the received signal the receiving unit 132 performs appropriate signal processing such as low noise amplification and frequency conversion, and provides the resulting signal to the inverse spread spectrum modulation unit 133.

The inverse spread spectrum modulation unit 133, which is the semiconductor device according to the present invention, obtains the PN codes from the code delay unit 113. The inverse spread spectrum modulation unit 133 also obtains the received signal from the receiving unit 132. The inverse spread spectrum modulation unit 133 performs inverse spread-spectrum modulation on the received signal using the PN codes. The resulting signal for which the inverse spread-spectrum modulation has been performed is provided to the signal processing unit 134.

In the inverse spread-spectrum modulation, if the received signal includes a component whose phase matches the phase of the PN codes, the inverse spread-modulation unit 133 outputs the same signal as the narrow-band signal for which the spread-spectrum modulation has not yet been performed by the transmitting apparatus. On the other hand, if the received signal does not include such a component, the inverse spread spectrum modulation unit 133 outputs the broad-band signal which is still spread over a wide band.

Thereby, even if the inverse spread spectrum modulation unit 133 obtains the received signal having various delayed components, components except the components whose phase matches the phase of the PN code are outputted as the broadband signal, which makes it possible to extract only the components whose phase matches the phase of the PN codes.

The signal processing unit 134 obtains the resulting signal from inverse spread spectrum modulation unit 133. Among the components included in the obtained signal, the signal processing unit 134 selects the same components as the narrow-band signal generated by the signal source 121. According to the selected components, the signal processing unit 134 measures reflection intensity to detect existence of the reflecting object.

Here, if the obtained signal includes the same components as the narrow-band signal generated by the signal source 121, the signal processing unit 134 determines, as a distance to the object, a distance corresponding to the time period delayed by the code delay unit 113.

On the other hand, if the obtained signal does not include the same components as the narrow-band signal generated by the signal source 121, the signal processing unit 34 changes a time period to be delayed by the code delay unit 113 to determine a distance to the object.

Figure 5:
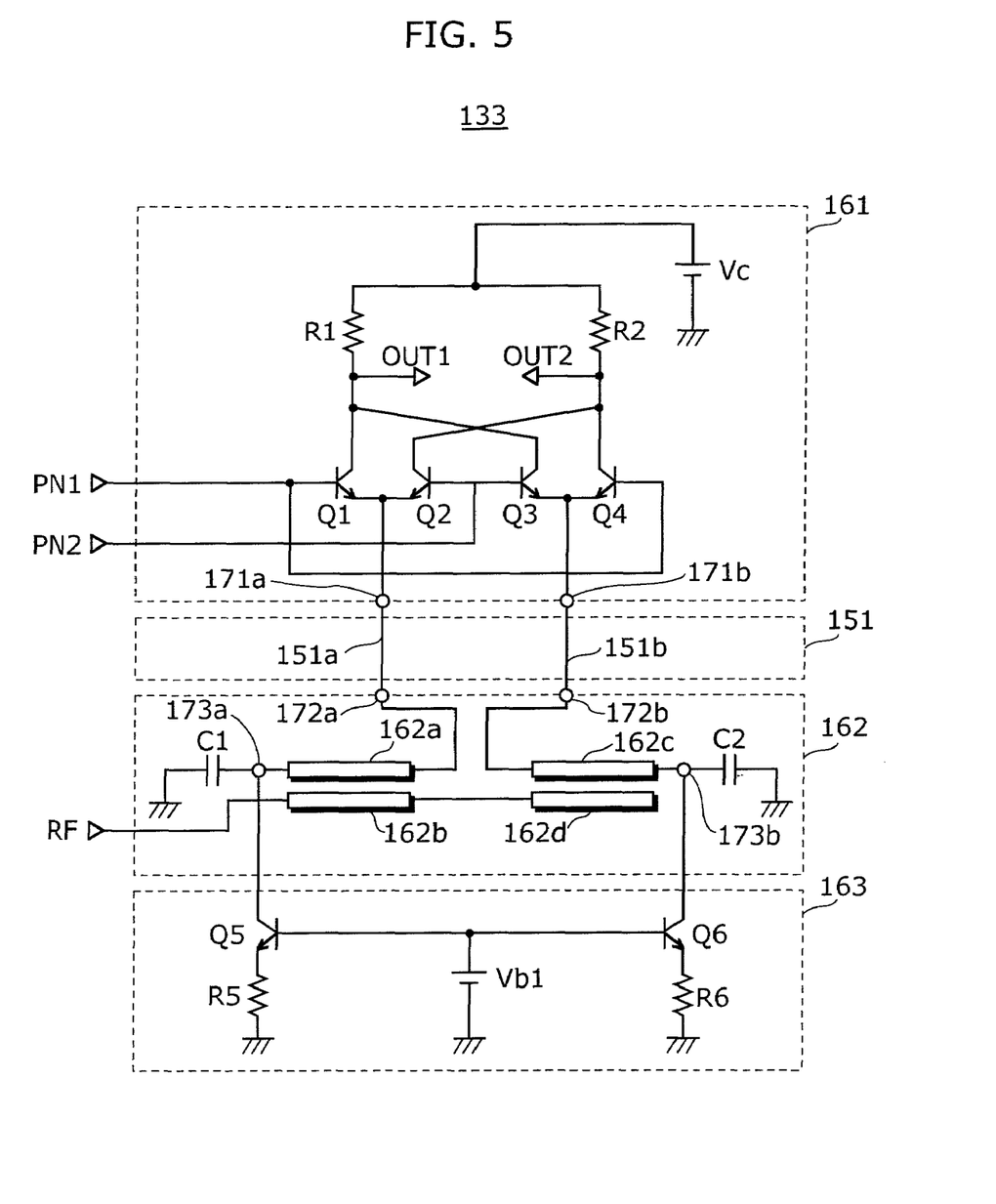
FIG. 5 is a diagram showing a circuit configuration of a semiconductor device (inverse spread spectrum modulation unit) used in the spread spectrum radar apparatus, according to the embodiment of the present invention.

FIG. 5 is a diagram showing a circuit configuration of the inverse spread spectrum modulation unit 133, which is the semiconductor device according to the present embodiment. As shown in FIG. 5, the inverse spread spectrum modulation unit 133 includes a balanced inverse spread spectrum circuit 161, an unbalanced to balanced transforming circuit 162, and a current power source circuit 163. The balanced inverse spread spectrum circuit 161 has the same configuration as the balanced inverse spread spectrum circuit 61 in the conventional inverse spread spectrum unit 33 of FIG. 2. The balanced inverse spread spectrum circuit 161 and the unbalanced to balanced transforming circuit 162 are connected via a balanced line 151 including a line 151a and a line 151b which have the same characteristics. Here, the balanced inverse spread spectrum circuit 161 and the unbalanced to balanced transforming circuit 162 are manufactured on the same semiconductor substrate. That is, active elements, passive elements, wirings, and the like, except DC power sources Vb1 and Vc, are integrated on the same semiconductor substrate. In more detail, the inverse spread spectrum modulation unit 133 includes: a semiconductor device made of high-frequency compound such as Gallium Arsenic Monolithic Microwave Integrated Circuit (GaAsMMIC), in which active elements, passive elements, wirings, and the like are integrated by being designed not to cause a delay between a positive signal and a negative signal in a pair; and power sources which supply DC voltages Vb1 and Vc to the semiconductor device.

The balanced inverse spread spectrum circuit 161 includes transistors Q1, Q2, Q3, and Q4, resisters R1 and R2, and a DC power source Vc. Bases of the transistors Q1 and Q4 are connected to a PN code terminal PN1. Bases of the transistors Q2 and Q3 are connected to a PN code terminal PN2. Collectors of the transistors Q1 and Q3 are connected to an output terminal OUT1. Collectors of the transistors Q2 and Q4 are connected to an output terminal OUT2. Emitters of the transistors Q1 and Q2 are connected to a balanced signal input terminal 171a. The balanced signal input terminal 171a is connected to a balanced signal output terminal 172a via the line 151a. Emitters of the transistors Q3 and Q4 are connected to a balanced signal input terminal 171b. The balanced signal input terminal 171b is connected to a balanced signal output terminal 172b via the line 151b. To the balanced signal input terminals 171a and 171b, a positive signal and a negative signal in a balanced signal pair outputted from the unbalanced to balanced transforming circuit 162 are inputted, respectively. One end of the resistor R1 is connected to the output terminal OUT1. One end of the resistor R2 is connected to the output terminal OUT2. The respective other ends of the resistors R1 and R2 are connected to one end of the DC power source Vc. The other end of the DC power source Vc is connected to ground.

With the configuration, a balanced signal pair outputted from the unbalanced to balanced transforming circuit 162 is inputted to the balanced inverse spread spectrum circuit 161 via the balanced line 151 having the lines 151a and 151b. PN codes outputted from the code delay unit 113 are inputted as a differential signal to the balanced inverse spread spectrum circuit 161 via the PN code terminals PN1 and PN2, respectively. According to the PN codes inputted as the differential signal via the PN code terminals PN1 and PN2, the polarities of a positive signal and a negative signal in a balanced signal pair are reversed in the balanced inverse spread spectrum circuit 161. A differential signal which is generated by the reversing is outputted to the signal processing unit 134 via the output terminals OUT1 and OUT2.

The unbalanced to balanced transforming circuit 162 includes lines 162a, 162b, 162c, and 162d, and capacitors C1 and C2. One end of the line 162a is connected to one end of the capacitor C1 via a terminal 173a. The other end of the line 162a is connected to the balanced signal output terminal 172a. One end of the line 162c is connected to one end of the capacitor C2 via a terminal 173b. The other end of the line 162c is connected to the balanced signal output terminal 172b. From the balanced signal output terminal 172a and 172b, the positive signal and the negative signal of the balanced signal pair are outputted, respectively. One end of the line 162b is connected to a received signal terminal RF. The other end of the line 162b is connected to one end of the line 162d. The other end of the 162d is opened.

Furthermore, the lines 162a and 162b form a coupled line, and the lines 162c and 162d form another couple line. These coupled lines form the balanced and unbalanced transforming circuit 162 (plane balun).

Thereby, when the received signal outputted from the receiving unit 132 is inputted as an unbalanced signal to the unbalanced to balanced transforming circuit 162 via the received signal terminal RF, the inputted unbalanced signal is converted into an ideal balanced signal pair. The resulting balanced signal pair is provided to the balanced inverse spread spectrum circuit 161 via the balanced line 151.

Note that the unbalanced signal is a signal based on a potential of a ground plane formed on a rear surface of the semiconductor device of the inverse spread spectrum modulation unit 133. Note also that the balanced signals are signals which provide a differential potential between the line 151a and the line 151b in the balanced line 151.

The current power source circuit 163 includes transistors Q5 and Q6, resistors R5 and R6, and a DC power source Vb1. A collector of the transistor Q5 is connected to one end of the capacitor C1 and one end of the line 162a, via the terminal 173a which is a connection point of the line 162a and the capacitor C1 which is connected to ground at high frequency. A collector of the transistor Q6 is connected to one end of the capacitor C2 and one end of the line 162c, via the terminal 173b which is a connection point of the line 162c and the capacitor C2 which is connected to ground at high frequency. An emitter of the transistor Q5 is connected to one end of the resistor R5. The other end of the resistor R5 is connected to ground. An emitter of the transistor Q6 is connected to one end of the resistor R6. The other end of the resistor R6 is connected to ground. Bases of the transistors Q5 and Q6 are connected to one end of the DC power source Vb1. The other end of the DC power source Vb1 is connected to ground.

With the above configuration, bias currents for operating the transistors Qt, Q2, Q3, and Q4 flow, from (i) a circuit made of the transistor Q5 and the resistor R5 and (ii) a circuit made of the transistor Q6 and the resistor R6, into the lines 151a and 151b in the balanced line 151, respectively, via the lines 162a and 162c in the unbalanced to balanced transforming circuit 162. The transistors Q5 and Q6 are respectively connected to a high-frequency connection point. Since a high-frequency voltage is not applied to the transistors Q5 and Q6, the transistors Q5 and Q6 which are active elements do not cause non-linear distortion.

With the configuration, the unbalanced to balanced transforming circuit 162 consists of only passive elements without any active elements, which can provide a circuit in which any non-linear distortion does not occur at all in the unbalanced to balanced transforming.

Furthermore, the switch circuit configured by the transistors Q1, Q2, Q3, and Q4 performs switching on only one of (i) a pair of the transistors Q1 and Q4 and (ii) a pair of the transistors Q2 and Q3 to be conducted, using the PN codes which are provided as a differential signal from the PN code terminals PN1 and PN2. Differential voltages applied to the PN code terminals PN1 and PN2 are adjusted to prevent the intermediate state where non-linear distortion easily occurs, thereby suppressing the non-linear distortion.

Accordingly, in the semiconductor device for the spread spectrum radar apparatus of the present embodiment, the received signal is inputted not directly to the active elements, but to the unbalanced to balanced transforming circuit 162 (plane balun) consisting of passive elements. Thereby, it is possible to suppress spurious signals resulting from non-linear components of active elements, eventually outputting ideal signals. Furthermore, by utilizing the semiconductor device for the spread spectrum radar apparatus as the spread spectrum modulation unit 133, it is possible to provide an ideal spread spectrum radar apparatus which can suppress even-order non-linear distortion and does not generate any spurious signals.

Note that a differential amplification circuit may be added between the unbalanced to balanced transforming circuit 162 and the balanced inverse spread spectrum circuit 161. In this case, since such a differential amplification circuit suppresses even-order non-linear distortion, it is possible, in the whole processing, to amplify signals while suppressing the even-order non-linear distortion and generation of spurious signals, thereby improving the object detection ability of the radar apparatus.

Note also that, although it has been described that the transistors in the inverse spread spectrum modulation unit 133 are bipolar transistors as shown in FIG. 5, the transistors may be field-effect transistors, in order to provide the same effects as the effects of the present embodiment.

Note also that, although each of the lines 162a, 162b, 162c, and 162d has a linear shape as shown in FIG. 5, the line may have a curbed shape or a spiral shape, in order to provide the same effects as the effects of the present embodiment.

Note also that the end of the line 162d may be connected to ground at high frequency directly or via a capacitor, in order to provide the same effects as the effects of the present embodiment.

Here, the following describes non-linearity of a circuit and shift additivity of a M sequence code.

When a circuit has non-linearity, between an input signal $V_i$ and an output signal $V_o$ there is a relationship expressed by the following equation (1).

[Equation 1]

$$V_o = a_1 V_i + a_2 V_i^2 + a_3 V_i^3 + a_4 V_i^4 + \ldots \quad (1)$$

Here, it is assumed that two received signals are inputted. One of them is assumed to be a received signal $R_1$ for which BPSK modulation is performed using a M-sequence code $M_i$. The received signal $R_1$ is expressed by the following equation (2). The other one is assumed to be a received signal $R_2$ for which the M-sequence code $M_i$ is delayed by j bits. The received signal $R_2$ is expressed by the following equation (3). As expressed by the following equation (4), the two received signals are added together to be a signal to be inputted.

[Equation 2]

$$R_1 = M_i \times \cos(2\pi f t) \quad (2)$$

[Equation 3]

$$R_2 = M_{i-j} \times \cos(2\pi f(t-jT)) \quad (3)$$

[Equation 4]

$$V_i = R_1 + R_2 \quad (4)$$

Note that a signal for which spread-spectrum modulation has not yet been performed by a transmitting apparatus is a signal having a frequency f. Note also that T denotes a time period for one bit of the M-sequence code, and that $M_i$ has a value of 1 or −1 according to the M-sequence code.

Then, the following equation (5) is obtained from the equations (4) and (1).

[Equation 5]

$$V_o = a_1(R_1+R_2) + a_2(R_1+R_2)^2 + a_3(R_1+R_2)^3 + a_4(R_1+R_2)^4 + \ldots \quad (5)$$

Thereby, a relational expression of the following equation (6) is obtained.

[Equation 6]

$$R_1^2 = M_i^2 \cos^2(2\pi f t) \quad (6)$$
$$= \frac{1}{2}(1 + \cos(2\pi \times 2 f t))$$

Note that $M_i^2 = 1$ due to the autocorrelation characteristics of M-sequence codes, so that the effect of the spread-spectrum modulation using the M-sequence code is lost. The same goes for $R_x^{2n}$ (n is a natural number, and x is 1 or 2). Note also that, because of the shift additivity of M-sequence codes, a component of $M_i \times M_{i-j}$ is equivalent to a component of a M-sequence code $M_{i-k}$ of the same sequence whose phase is different from $M_i$ and $M_{i-j}$. In consideration that this results in a spurious signal, the spurious signal is thought to be resulted from even-order non-linearity, because a component $a_{2n}(R_1+R_2)^{2n}$ resulted from even-order non-linearity includes the component of $M_i \times M_{i-j}$.

Signals resulted from the even-order non-linearity do not include a component of frequency f. It is ideal and preferable that other components of frequencies except the frequency f are eliminated by a receiving apparatus. However, in reality, signals which are generated by inverse spread-spectrum modulation and using frequency f as a center frequency are selectively converted by a signal processing circuit such as an orthogonal modulator into signals of base-band frequency whose center frequency is frequency 0. Due to through-leakage or non-linearity of the orthogonal modulator, it is difficult to completely eliminate frequency components of the converted signals, in other words, true radar signals, even if the signals are resulted from the even-order non-linearity. Thereby, the frequency components of the signals are converted into components of base-band frequency, and the signals generated by the conversion are eventually outputted as spurious signals. In particular, signal intensity of a received signal is decreased inversely proportional to the fourth power of a distance to a reflecting object. For example, there is difference of signal intensity about 90 dB, between a human body about 10 m away and a strongly-reflecting object such as a metal plate in an extremely short distance. Therefore, even slight spurious signals cause a serious problem. Accordingly, in order to realize the ideal spread spectrum radar apparatus without spurious signals, it is important to eliminate, as much as possible, the even-order non-linearity in the pass to the inverse spread spectrum modulation unit 133.

In order to achieve this, according to the semiconductor device of the present embodiment, the signals inputted to the balanced inverse spread spectrum circuit 161 are signals which are generated by converting a received signal into a balanced signal pair in the unbalanced to balanced transforming circuit 162. Here, the unbalanced to balanced transforming circuit which is manufactured as the semiconductor device on a semiconductor substrate can be manufactured with high accuracy using known high-level semiconductor manufacturing technologies, which makes it possible to generate an ideal differential signal with less phase errors and amplification errors in the balanced line 151 having a pair of lines. Thereby, since the balanced inverse spread spectrum circuit 161 operates in an ideal balanced state, the balanced inverse spread spectrum circuit 161 can suppress signal distortion due to even-order non-linearity. In more detail, when potentials of the signal lines in the pair are $V_1$ and $V_2$, respectively, the ideal differential signal $V_d$ is expressed by the following equation (9) from the following equations (7) and (8).

[Equation 7]

$$V_1 = V_o + V \quad (7)$$

[Equation 8]

$$V_2 = V_o - V \quad (8)$$

[Equation 9]

$$V_d = V_1 - V_2 \quad (9)$$
$$= 2V$$

Note that $V_o$ denotes a common potential. Components resulting from even-order differential non-linearity after passing a non-linear circuit are expressed by the following equations (10) and (11).

[Equation 10]

$$V_1^{2n} = V'_0 + A \cdot V^{2n} \quad (10)$$

[Equation 11]

$$V_2^{2n} = V'_0 + A \cdot V^{2n} \quad (11)$$

Note that $V_o'$ denotes a common potential after passing the non-linear circuit, and that A is a constant number. The even-order components are converted into in-phase signals, and the components which are converted into the in-phase signals are easily reduced via a differential amplifier or the like.

Moreover, as previously described, the unbalanced to balanced transforming circuit 162 and the balanced inverse spread spectrum circuit 161 are integrated on the same semiconductor substrate. With the configuration, using known high-level semiconductor manufacturing technologies, it is possible to manufacture a line length of each of the lines 151$a$ and 151$b$ in the balanced line 151 with high accuracy and with the same length. As a result, the unbalanced to balanced transforming circuit 162 can generate an ideal differential signal with less phase errors and amplification errors, in comparison with the conventional case where the unbalanced to balanced transforming circuit is manufactured on a ceramic substrate or a printed substrate outside the semiconductor device, a line is formed by wire bond or the like, and the unbalanced to balanced transforming circuit is connected to the inverse spread spectrum modulation unit in the semiconductor device. Accordingly, the present invention can suppress signal distortion resulted from even-order non-linearity, and thereby realize the ideal spread spectrum radar apparatus without any spurious signals.

Although only the exemplary embodiment of the present invention has been described in detail above, those skilled in the art will be readily appreciate that many modifications are possible in the exemplary embodiment without materially departing from the novel teachings and advantages of the present invention. Accordingly, all such modifications are intended to be included within the scope of the present invention.

INDUSTRIAL APPLICABILITY

The present invention can be applied as a semiconductor device which is used and embedded in a spread spectrum radar apparatus employing the spread spectrum scheme, and more particularly as a semiconductor device for a spread spectrum radar apparatus which suppress spurious signals caused by non-linear components of active elements. The spread spectrum radar apparatus in which the semiconductor device is embedded is suitable as in-vehicle radar apparatuses and the like.

What is claimed is:

1. A semiconductor device for a spread spectrum radar apparatus, the semiconductor device being embedded in the spread spectrum radar apparatus which transmits, as a detection radio wave, a broad-band signal generated using a pseudo-noise code, receives a reflected wave of the detection radio wave that is reflected at an object and returns, and detects the object by the reflected wave of the detection radio wave using the pseudo-noise code, said semiconductor device comprising:

an unbalanced to balanced transforming circuit which includes a first coupled line and a second coupled line that receive, as an unbalanced signal, a received signal corresponding to the reflected wave of the detection radio wave, and which converts the received signal into a pair of a balanced signal consisting of a positive signal and a negative signal, and outputs the pair of the balanced signal from said first coupled line and said second coupled line; and a balanced inverse spread spectrum circuit which includes a switch circuit having at least one transistor, and which receives, as a differential signal, pseudo-noise codes belonging to a same sequence code as the pseudo-noise code which is used in the generation of the broad-band signal, obtains the pair of the balanced signal from said unbalanced to balanced transforming circuit, performs inverse spread spectrum modulation on the pair of the balanced signal to generate a differential signal by said switch circuit using the pseudo-noise codes as the differential signal, and outputs, as output signals, the differential signal generated by the inverse spread-spectrum modulation, wherein said unbalanced to balanced transforming circuit and said balanced inverse spread spectrum circuit are formed on a same semiconductor substrate.

2. The semiconductor device according to claim 1, wherein said switch circuit includes at least a first transistor, a second transistor, a third transistor, and a fourth transistor, a first terminal of the first transistor and a first terminal of the fourth transistor are connected to a first pseudo-noise input terminal from which a first pseudo-noise signal in the pseudo-noise codes as the differential signal is inputted, and a first terminal of the second transistor and a first terminal of the third transistor are connected to a second pseudo-noise input terminal from which a second pseudo-noise signal in the pseudo-noise codes as the differential signal is inputted, a second terminal of the first transistor and a second terminal of the second transistor are connected to a positive signal input terminal from which the positive signal in the pair is inputted, and a second terminal of the third transistor and a second terminal of the fourth transistor are connected to a negative signal input terminal from which the negative signal in the pair is inputted, and a third terminal of the first transistor and a third terminal of the third transistor are connected to a first signal output terminal from which a first output signal of the differential signal as the output signals is outputted, and a third terminal of the second transistor and a third terminal of the fourth transistor are connected to a second signal output terminal from which a second output signal of the differential signal as the output signals is inputted.

3. The semiconductor device according to claim 2, wherein said first coupled line includes a first line and a second line which are arranged in parallel with each other and electromagnetically coupled with each other, said second coupled line includes a third line and a fourth line which are arranged in parallel with each other and electromagnetically coupled with each other, one end of said second line is connected with one end of said fourth line to form one line, another end of said second line receives the received signal, and said unbalanced to balanced transforming circuit includes: a positive signal output terminal which is connected to one end of said first line, and from which the positive signal in the pair is outputted; and a negative signal output terminal which is connected to one end of said third line, and from which the negative signal in the pair is outputted, wherein a first end terminal that is another end of said first line and a second end terminal that is another end of said third line are respectively connected to ground at high frequency, and the first end terminal and the second end terminal are also connected to a DC power source circuit, wherein the DC power source circuit supplies predetermined currents to the positive signal input terminal via the positive signal output terminal, and to the negative signal input terminal via the negative signal output terminal.

4. The semiconductor device according to claim 3, wherein said unbalanced to balanced transforming circuit and said balanced inverse spread spectrum circuit are connected with each other via a differential amplifier.

5. The semiconductor device according to claim 2, wherein the first to fourth transistors are bipolar transistors, with the respective first terminals being bases, the respective second terminals being emitters, and the respective third terminals being collectors.

6. The semiconductor device according to claim 2, wherein the first to fourth transistors are field-effect transistors, with the respective first terminals being gates, the respective second terminals being sources, and the respective third terminals being drains.

7. The semiconductor device according to claim 2, wherein said unbalanced to balanced transforming circuit and said balanced inverse spread spectrum circuit are connected with each other via a differential amplifier.

8. The semiconductor device according to claim 1, wherein said unbalanced to balanced transforming circuit and said balanced inverse spread spectrum circuit are connected with each other via a differential amplifier.

9. A spread spectrum radar apparatus comprising:

a signal source which generates a narrow-band signal;

a pseudo-noise code generation unit operable to generate a pseudo-noise code;

a spread spectrum modulation unit operable to perform spread spectrum modulation on the narrow-band signal generated by said signal source to generate a broad-band signal, using the pseudo-noise code generated by said pseudo-noise code generation unit;

a transmitting unit operable to transmit, as a detection radio wave, the broad-band signal generated by the spread spectrum modulation by said spread spectrum modulation unit;

a receiving unit operable to receive, as a received signal, a reflected wave of the detection radio wave which is reflected at a predetermined object and returns;

an inverse spread spectrum modulation unit operable to perform inverse spread spectrum modulation on the received signal to generate a narrow-band signal, using pseudo-noise codes which are the same as the pseudo-noise code generated by said pseudo-noise code generation unit;

a signal processing unit operable to determine a characteristic of the predetermined object, based on a certain frequency component in the narrow-band signal generated by the inverse spread spectrum modulation by said inverse spread spectrum modulation unit, wherein said inverse spread spectrum modulation unit includes:

an unbalanced to balanced transforming circuit which includes a first coupled line and a second coupled line, and which obtains, as an unbalanced signal, the received signal corresponding to the reflected wave of the detection radio wave, converts the received signal into a pair of a balanced signal consisting of a positive signal and a negative signal, and outputs the pair of the balanced signal; and a balanced inverse spread spectrum circuit which includes a switch circuit having at least one transistor, and which receives, as a differential signal, pseudo-noise codes belonging to a same sequence code as the pseudo-noise code which is used in the generation of the broad-band signal, obtains the pair of the balanced signal from said unbalanced to balanced transforming circuit, performs inverse spread spectrum modulation on the pair of the balanced signal to generate a differential signal by said switch circuit using the pseudo-noise codes as the differential signal, and outputs, as output signals, the differential signal generated by the inverse spread-spectrum modulation, wherein said unbalanced to balanced transforming circuit and said balanced inverse spread spectrum circuit are formed on a same semiconductor substrate.

10. The spread spectrum radar apparatus according to claim 9, wherein said switch circuit includes at least a first transistor, a second transistor, a third transistor, and a fourth transistor, a first terminal of the first transistor and a first terminal of the fourth transistor are connected to a first pseudo-noise input terminal from which a first pseudo-noise signal in the pseudo-noise codes as the differential signal is inputted, and a first terminal of the second transistor and a first terminal of the third transistor are connected to a second pseudo-noise input terminal from which a second pseudo-noise signal in the pseudo-noise codes as the differential signal is inputted, a second terminal of the first transistor and a second terminal of the second transistor are connected to a positive signal input terminal from which the positive signal in the pair is inputted, and a second terminal of the third transistor and a second terminal of the fourth transistor are connected to a negative signal input terminal from which the negative signal in the pair is inputted, and a third terminal of the first transistor and a third terminal of the third transistor are connected to a first signal output terminal from which a first output signal of the differential signal as the output signals is outputted, and a third terminal of the second transistor and a third terminal of the fourth transistor are connected to a second signal output terminal from which a second output signal of the differential signal as the output signals is inputted.

11. The spread spectrum radar apparatus according to claim 10, wherein said first coupled line includes a first line and a second line which are arranged in parallel with each other and electromagnetically coupled with each other, said second coupled line includes a third line and a fourth line which are arranged in parallel with each other and electromagnetically coupled with each other, one end of said second line is connected with one end of said fourth line to form one line, another end of said second line receives the received signal, and said unbalanced to balanced transforming circuit includes: a positive signal output terminal which is connected to one end of said first line, and from which the positive signal in the pair is outputted; and a negative signal output terminal which is connected to one end of said third line, and from which the negative signal in the pair is outputted, wherein a first end terminal corresponding to the positive signal output terminal and a second end terminal corresponding to the negative signal output terminal are respectively connected to ground at high frequency, and the first end terminal and the second end terminal are also connected to a DC power source circuit, wherein the DC power source circuit supplies predetermined currents to the positive signal input terminal via the positive signal output terminal, and to the negative signal input terminal via the negative signal output terminal.

12. The spread spectrum radar apparatus according to claim 11, wherein said unbalanced to balanced transforming circuit and said balanced inverse spread spectrum circuit are connected with each other via a differential amplifier.

* * * * *